United States Patent [19]

Dower

[11] 3,750,480
[45] Aug. 7, 1973

[54] PNEUMATIC MEASUREMENT APPARATUS

[75] Inventor: Ethell J. Dower, Houston, Tex.

[73] Assignee: Warren Automatic Tool Company, Houston, Tex.

[22] Filed: Apr. 23, 1971

[21] Appl. No.: 136,740

[52] U.S. Cl. .................... 73/506, 73/151.5, 73/521
[51] Int. Cl. ...................... G01p 3/26, E21b 45/00
[58] Field of Search................... 73/151.5, 151, 506, 73/521; 137/82, 624.13, 624.15; 235/200 R

[56] References Cited
UNITED STATES PATENTS

| 3,264,650 | 8/1966 | Armstrong | 346/36 |
|---|---|---|---|
| 3,489,175 | 1/1970 | Loveless et al. | 137/624.15 |
| 3,371,675 | 3/1968 | Hatch, Jr. | 137/81.5 |
| 3,335,754 | 8/1967 | Lankford, Jr. et al. | 137/624.15 |
| 3,214,762 | 10/1965 | Van Winkle et al. | 73/151.5 X |
| 3,181,165 | 4/1965 | Van Winkle et al. | 73/151 X |
| 3,084,550 | 4/1963 | Bowditch | 346/36 |
| 3,028,050 | 4/1962 | Nelson | 137/624.15 X |
| 2,960,097 | 11/1960 | Scheffler | 346/36 |
| 2,952,502 | 9/1960 | Hildenbrandt, Jr. | 346/36 |
| 2,688,871 | 9/1954 | Lubinski | 73/151.5 |
| 3,216,252 | 11/1965 | Chapman et al. | 73/521 UX |

FOREIGN PATENTS OR APPLICATIONS

| 81,293 | 12/1894 | Germany | 73/506 |

*Primary Examiner*—Jerry W. Myracle
*Attorney*—Paul E. Harris, Lee R. Larkin, Marcus L. Thompson and Lary B. Phillips

[57] ABSTRACT

A pneumatic apparatus and method for measuring a function. Pneumatic pulses representative of the function are generated, integrated and monitored as an indication of the function. The integrated pulse pressure is controllably vented and means are provided for supplying to the pulse generator a pressurized pneumatic fluid which is incrementally higher in pressure than the pressure of the integrated pulses.

13 Claims, 4 Drawing Figures

Ethell J. Dower
INVENTOR

BY Lee R. Larkin
ATTORNEY

Ethell J. Dower
INVENTOR

BY Lee R. Larkin
ATTORNEY

PNEUMATIC MEASUREMENT APPARATUS

BACKGROUND OF THE INVENTION

1. Field of the Invention

Pneumatic apparatus and method for measuring a function.

2. Description of the Prior Art

Various electrically actuated and/or controlled measurement devices are available in the art for sensing a function and providing an output representative thereof. Particularly in the oil and gas industry several electrical devices of different designs may be found which sense movement of a drilling rig traveling block and provide an output indication of drilling rate, typically in feet drilled per hour of drilling time. However, there are no known pneumatically operated devices for performing these measurement functions, whether or not related to the oil and gas industry.

SUMMARY OF THE INVENTION

The measuring apparatus of this invention includes means for generating a series of pneumatic pulses representative of a function to be measured, integrating the pulses to create a measurement signal, and monitoring the measurement signal as an indication of the function measured. The apparatus also includes means for controllably venting the measurement signal and means for supplying to the pulse generating means a pressurized pneumatic fluid which is continuously incrementally greater in pressure than the measurement signal. The pneumatic pulses are preferably generated by periodically actuating a valve connected to a closed container of pressurized pneumatic fluid to thereby release the fluid therein, and recharging the container during periods when the valve is not actuated. Integration of the pneumatic fluid pulses is preferably accomplished by directing the pulses to a second container. If desired, a double acting valve with two closed containers connected thereto for the alternate charging and discharging of pressurized pneumatic fluid may be used so that a larger number of pulses may be generated for a given measured function.

The method of this invention includes generating a series of pneumatic pulses representative of a function being measured, integrating the pulses to create a measurement signal, and monitoring the pressure of the measurement signal as an indication of the function being measured. The method also includes continuously venting the measurement signal and simultaneously supplying to the pulse generating apparatus a pressurized pneumatic fluid at a predetermined incremental pressure higher than the pressure of the measurement signal. The step of integrating the pulses may be performed by supplying the pneumatic pulses to a closed container through a pulse smoothing restrictor. In this method the step of generating the pneumatic pulses preferably includes supplying the pressurized pneumatic fluid to a closed container and periodically releasing the fluid in this container in response to changes in the function being measured.

Both the apparatus and method of this invention are adapted to a variety of uses including measurement of revolutions per minute of a rotating mechanism, measurement of strokes per minute of a reciprocating mechanism and measurement of linear motion per unit time of a linear mechanism. Both the apparatus and method are particularly useful in applications where more conventional electrically activated measurement devices cannot be conveniently used. For example, in the oil and gas well drilling art there is frequently no readily available and reliable source of electricity. Even when electricity is available, it may be dangerous to use electrically actuated devices due to the possibility of an explosion.

DESCRIPTION OF THE PREFERRED EMBODIMENT

Figure 1:
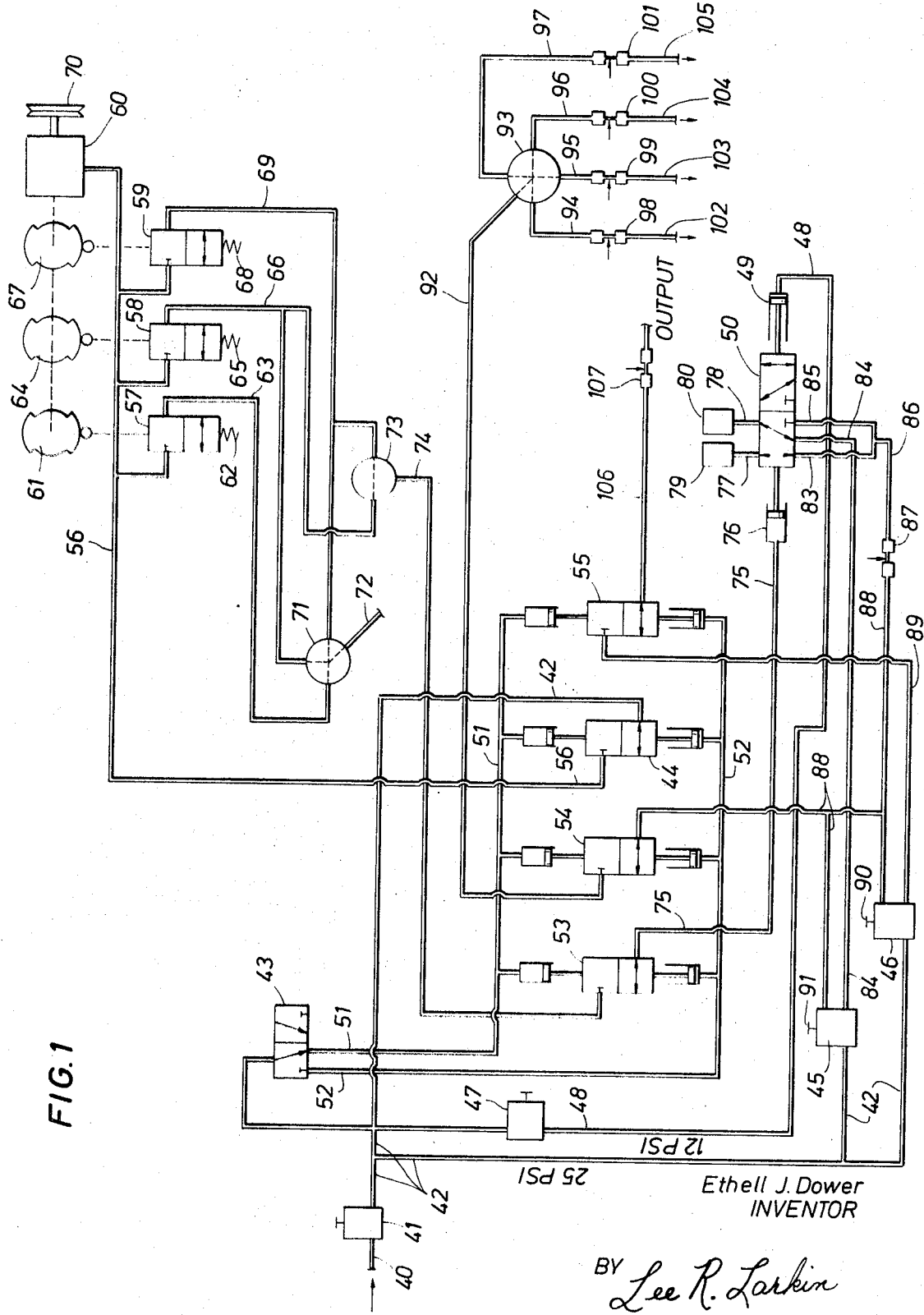
FIG. 1 illustrates generally schematically one embodiment of the pneumatic circuit apparatus of this invention.

Referring to the drawings, and particularly to the simplified schematic shown in FIG. 2, one embodiment of the apparatus will be described in detail. The FIG. 2 apparatus is illustrated and will be described for use in measuring the rate of penetration of a drill bit in a well bore. However, as explained above, this apparatus is adaptable to a variety of other function measurement applications.

Figure 2:
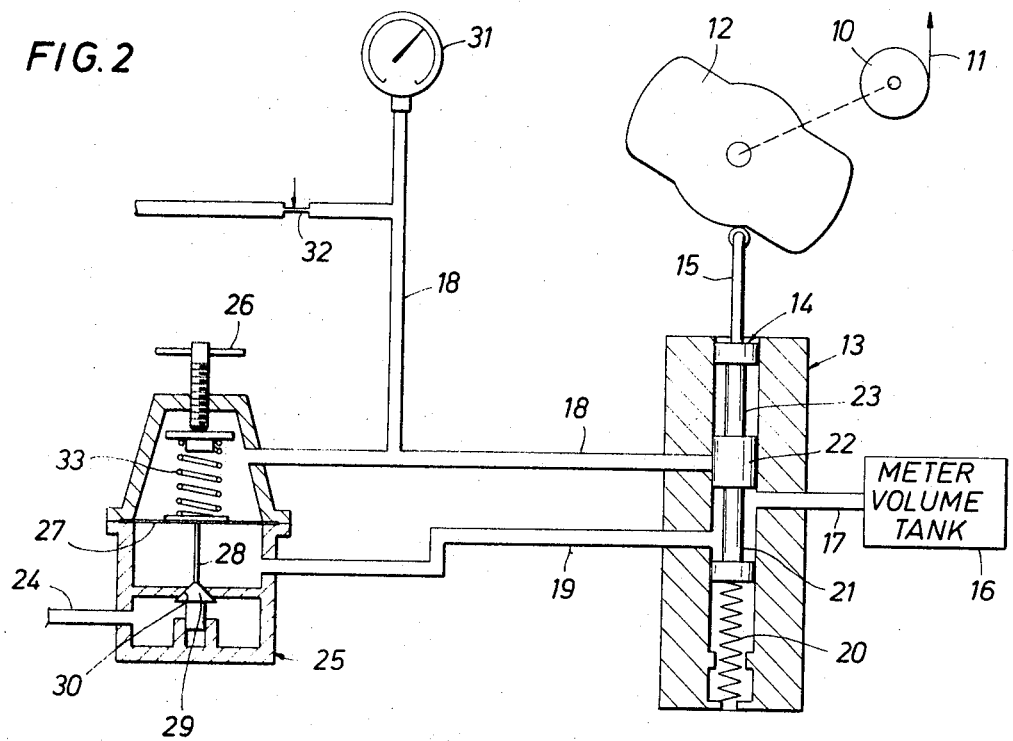
FIG. 2 illustrates generally schematically a second and somewhat simplified embodiment of the pneumatic circuit apparatus of this invention.

Referring now to FIG. 2, a wire line pulley 10 is shown with a wire 11 extending therefrom. Wire 11 is arranged to be threaded over a crown block pulley (not shown) and then connected to the traveling block (not shown) of a drilling rig. Thus, with pulley 10 rotatably anchored to some convenient portion of the drilling rig in a conventional manner, movement of the traveling block will cause a proportionate rotation of pulley 10. A two-lobed cam 12 is operably connected to pulley 10 in a conventional manner (not shown) and is arranged for rotation therewith. A pneumatic meter valve 13 is operably positioned adjacent cam 12 and has a valving spool 14 therein having a cam follower arm 15 extending therefrom and arranged to contact cam 12.

Valve 13 has a closed meter volume tank 16 connected thereto by pneumatic line 17 and is additionally connected to pneumatic lines 18 and 19, the function of which is described below. Spool 14 and cam follower 15 connected thereto are continuously biased upward within valve 13 by spring 20.

When spool 14 is in its uppermost position, as illustrated in FIG. 2, pneumatic line 19 communicates with meter volume tank 16 through annular recess 21 in spool 14, and pneumatic line 18 is blocked by annular portion 22 of spool 14.

When spool 14 is forced downward, as viewed in FIG. 2, by the action of cam 12 upon cam follower 15, portion 22 of spool 14 moves downward and blocks line 19, and line 18 is allowed to communicate with meter volume tank 16 by way of annular groove 23 in spool 14. Thus, meter volume tank 16 is alternately connected to either pneumatic line 18 or pneumatic line 19, depending upon the position of spool 14, while the other of lines 18 and 19 is blocked.

Referring now to the left portion of FIG. 2, pressurized pneumatic fluid from any convenient source (not shown) for activating this apparatus is provided through pneumatic line 24 to the lower portion of bias relay 25. Relay 25 has an output pressure on line 19 which is equal to the sum of the manually controlled pressure set by control handle 26 plus the signal pressure delivered to relay 25 by line 18, as described below. Basically, the construction and operation of relay 25 is as follows. Relay 25 is divided into upper and lower chambers by diaphragm 27, from which depends valve stem 28 having a valving member 29 thereon. Valving member 29 operates in valve seat 30 to control the flow of pressurized fluid from line 24 to line 19. Diaphragm 27 is urged downward by bias spring 33, thereabove, the downward force of which is adjustable by turning control handle 26. In addition, diaphragm 27 is urged downward by any pneumatic pressure thereabove which is received from line 18. Therefore, the resulting output pressure on line 19 is always greater in pressure than the pressure in line 18 by a preset amount determined by the downward bias exerted by spring 33. Although shown in simplified schematic form, a suitable relay for use in this circuit is the bias relay manufactured by Moore Products of Spring House, Penna. and identified as Model 681.

In addition to the foregoing, pneumatic line 18 also communicates with a conventional pressure gauge 31, the read-out scale of which may be calibrated in terms of the function being measured, as described below.

Pneumatic line 18 is vented to atmosphere through adjustable orifice member or restrictor 32. This restrictor may conveniently assume the form of an adjustable needle valve such as that manufactured by Flo-Lok, Inc. of Houston, Tex., as Model No. A506.

In operation, wire line 11 and pulley 10 are arranged on a drilling rig as described above and a pressurized source of pneumatic fluid such as compressed air is provided to pneumatic line 24. Restrictor 32 is adjusted to have a small opening therethrough to allow gradual bleed off of any air pressure contained in line 18. Control handle 26 of bias relay 25 is adjusted to provide a pneumatic fluid pressure on line 19 greater than whatever pressure is present on line 18 by a predetermined incremental amount, e.g., 3 pounds per square inch.

With the apparatus thus prepared and cam 12 in the position shown in FIG. 2, the three pound pressure in line 19 communicates with meter volume tank 16 through recess 21 in spool 14, thereby charging tank 16 to three pounds per square inch. Rotation of cam 12 due to movement of wire line 11 forces cam follower 15 and spool 14 downward, as viewed in FIG. 2, and line 19 is blocked by portion 22 of spool 14, with the pressure in tank 16 being discharged into line 18 through recess 23 of spool 14. This pressure pulse from tank 16 communicates through line 18 with the upper portion of relay 25 and with pressure gauge 31 and is gradually vented or bled off by release through restrictor 32. Continued rotation of cam 12 causes reciprocation of spool 14, thereby alternatively charging and discharging tank 16.

Line 18, along with the upper portion of valve 13 acts as an integrator of the pulses received from tank 16, and converts these pulses into a relatively steady state pressure reading on gauge 31. Due to the relatively small opening in restrictor 32, the pressure in line 18 will gradually rise upon receipt of a continuing series of pulses from tank 16. As the line 18 pressure rises, the line 19 pressure also continues to rise due to the action of relay 25, as described above. Therefore, the pressure charge stored in tank 16 and the resulting pressure pulse periodically released into line 18 will always be greater in value by a predetermined increment of pressure than the previously existing pressure in line 18.

As is commonly known, the flow rate of pneumatic fluid out of line 18 through orifice or restrictor 32 is proportional to the square root of the pressure drop across restrictor 32. Since this is a nonlinear relationship, the pressure in line 18 and the reading on gauge 31 would increase nonlinearly in response to a linear increase in pulse repetition rate, if it were not for the foregoing described action of relay 25. Therefore, by using relay 25 to continually provide an incrementally higher pressure to tank 16 than the then existing pressure in line 18, the resultant pressure increase in line 18 and the reading on gauge 31 will be linear due to a linear increase in the movement of wire line 11, up to the point where the pressure in line 18 approaches the supply pressure provided on line 24. By properly adjusting the opening in restrictor 32, the pressure in line 18 can be continually vented rapidly enough to prevent the pressure in line 18 from approaching the supply pressure in line 24 for the expected repetition rate involved.

Although not specifically illustrated in FIG. 2, several modifications to the FIG. 2 circuit are contemplated by the inventor. For example, if the smaller fluctuations in pressure gauge 31 are desired than are achievable solely through integration caused by the volume within line 18 and the circuit communicating therewith, a second restrictor could be inserted in line 18 adjacent its connection to valve 13. This restrictor would then act to smooth out the peak portions of the pulses from tank 16 and would help to reduce fluctuations in gauge 31. Additionally if desired, valve 13 could be replaced with a four-way valve having two meter volume tanks connected thereto, arranged so that each full rotation of a two lobed cam would produce four pulses to line 18 rather than two. Further, valve 13 could be simply arranged to be actuated pneumatically, rather than mechanically, so that it could be displaced from cam 12 to any convenient area. In this way, the length of pressure line 18 and consequently the overall volume of the integrator portion of the circuit could be more accurately controlled. All of the foregoing proposed modifications to the FIG. 2 embodiment are incorporated in the FIG. 1 embodiment described below.

Referring now to FIG. 1, a more detailed and sophisticated embodiment of the apparatus of this invention will be described. An unregulated source of pressurized pneumatic fluid, e.g., air, is supplied to the circuit of FIG. 1 through pressure line 40. Line 40 delivers this air to a pressure regulator 41 which acts as the master control switch for the apparatus. Although any convenient pressure level can be selected, the remainder of this description will assume that regulator 41 is set to provide a regulated output pressure of 25 pounds per square inch on pressure line 42 connected thereto. Line 42 communicates this pressure to several circuit elements including manually actuated standby/operate valve 43, signal generator control valve 44, input bias relay 45, output bias relay 46, and meter valve bias regulator 47, all of which are described below. Regulator 47 is arranged to provide a regulated output of 12 pounds per square inch on line 48 which is directed to actuator 49 of master metering valve 50, the function of which is described below.

Standby/operate valve 43 is a manually actuated two-way valve of the conventional design which directs the pressure from line 42 to either of lines 51 or 52 connected thereto, while venting the other line. Line 51 from valve 43 may be characterized as the "on" pressure line for signal generator control valve 44 and for meter valve actuator control valve 53, vent control valve 54, and outlet valve 55, all of which are connected in parallel.

Valve 44 and valves 53 – 55 are all of the pneumatically actuated single circuit type, arranged to interconnect the two pressure lines connected thereto when in a first position, and arranged to block the two pressure lines when in a second position. Similarly, pressure line 52 from valve 43 may be characterized as the "off" control line and is connected to the second actuator side of each of valves 44 and 53 – 55 in parallel. Therefore, when valve 43 is in the standby position, as shown in FIG. 1, pressurized air from line 42 is directed through valve 43 to line 51 and then to one actuator end of each of valves 44 and 53 – 55, forcing each of those valves to the off or closed position as shown in FIG. 1. By switching valve 43 to the on position, line 51 would be vented through valve 43 and the pressure from line 42 would be directed through line 52 to the second side of each of valves 44 and 53 – 55 to actuate them to the on position.

When valve 44 is in the on position, the air from line 42 is directed through valve 44 to line 56 which in turn is connected in parallel to the inlets of signal generator valves 57, 58, and 59, and to air clutch 60, the function of which is described below.

Signal generator valve 57 is positioned adjacent a cam 61 for actuation thereby. Valve 57 is biased to the normally closed position by a spring 62 to prevent a flow of pressurized gas therethrough. Upon actuation by cam 61, spring 62 is compressed and the pressure in line 56 communicates with a pressure line 63 connected to the outlet of valve 57. Similarly, signal generator valve 58 is positioned adjacent a cam 64 and is arranged for actuation thereby. Valve 58 is held in the normally closed position by spring 65, thereby preventing a flow of gas therethrough. Upon actuation by cam 64, valve 58 connects pressure line 56 to pressure line 66 connected to the output thereof. In a similar manner, valve 59 is positioned adjacent a cam 67 and is arranged for actuation thereby. Valve 59 is likewise biased to the closed position by a spring 68 and it likewise connects line 56 to an outlet pressure line 69 when actuated by cam 67. In other words, each of valves 57 – 59 are of the single acting type arranged for movement to a first closed position where the two pressure lines connected thereto are blocked, and to a second position where the two pressure lines are in communication, and valves 57 – 59 are normally biased to the first or blocked position by springs 62, 65, and 68, respectively.

Cams 61, 64 and 67 are arranged for rotation on a common shaft which is coupled to a measuring line pulley 70 by air clutch 60. Pulley 70 is provided with a measurement line connected to the drilling rig traveling block (not shown). Cams 61, 64 and 67 are provided with different numbers of projections or lobes thereon so that, in one revolution of pulley 70, a different number of pneumatic pulses are generated by valves 57, 58, and 59, respectively. For example, cam 61 might be provided with ten lobes, cam 64 with two lobes, and cam 67 with four lobes.

The output lines 63, 66 and 69, of valves 57 – 59, respectively are each directed to a three-way plug valve 71 which is used as a chart drive selector switch. The output from the valve 71 on line 72 may be used to advance the chart of a pneumatically actuated chart recorder (not shown). Thus, by operating valve 71 to select the desired signal generator valve output, an appropriate chart movement for the existing drilling conditions may be obtained.

The outlet lines 66 and 69 of valves 58 and 59, respectively, are also directed to a two-way plug valve 73 which acts as a range selector valve for the metering apparatus, as described below. The output of valve 73 is provided on line 74.

The selected pneumatic signal on line 74 is directed to the input of valve 53, and, when valve 53 is in the on position, through line 75 to the second actuator 76 of metering valve 50. As described below, metering valve 50 is a pneumatically actuated valve which is biased to its first position by the 12 pound per square inch pressure on line 48 directed to actuator 49. Periodically valve 50 is actuated to its second position, as described below, by the 25 pounds per square inch signal generated by one of valves 57 – 59 and delivered to actuator 76 on line 75, as described above. Valve 50 has connected thereto by lines 77 and 78, closed pneumatic containers or metering tanks 79 and 80, resectively, the function of which is described below.

Figure 3:
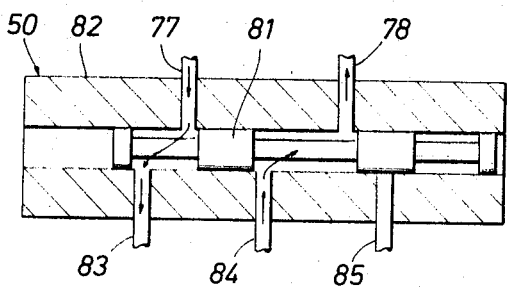
FIG. 3 illustrates in schematic cross-section one form of a meter valve which may be used with the apparatus of this invention, with the spool of the valve in a first portion.
Figure 4:
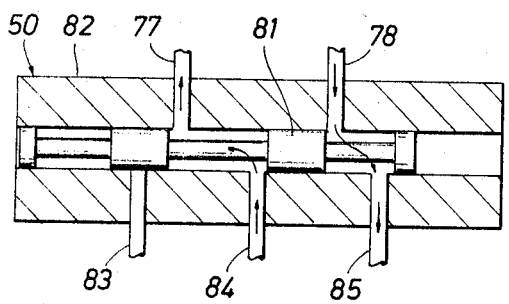
FIG. 4 illustrates the valve of FIG. 3 with the spool shifted to a second position.

Referring now to FIG. 3, a valve suitable for use as metering valve 50 is illustrated in schematic cross-section and includes a cylindrical valving spool 81 arranged for movement within valve body 82. Body 82 has connected thereto pressure lines 77 and 78, described above, and pressure lines 83 – 85. Line 84 acts as a pressurized pneumatic fluid inlet line to valve 50, while lines 83 and 85 are arranged as outlet lines therefrom. When spool 81 is in the first or righthand position, as shown in FIG. 3, a pneumatic pressure in line 84 is directed through spool 81 to line 78 and into meter tank 80. At the same time, any pressure contained within tank 79 is allowed to evacuate through line 77 and through spool 81 to line 83. Line 85 is blocked by spool 81 at this time. When spool 81 is in its second or lefthand position, as shown in FIG. 4, any pressurized gas contained within tank 80 is allowed to evacuate through line 78 and through spool 81 to line 85. At that time the pressurized inlet gas in line 84 is direced to meter tank 79 through spool 81 and line 77, while outlet line 83 is blocked by spool 81.

Referring again to FIG. 1, it should be noted that in this FIG., metering valve 50 is schematically illustrated as having spool 81 in the same rightward position as that shown in FIG. 3. This spool position would arise when a 25 psi signal pulse is applied to actuator 76 while a 12 psi bias signal is maintained on actuator 49.

As described above, valve 50 is a pneumatically actuated four-way valve. One suitable valve for use as valve 50 in this circuit is Scovill Mfg. Co. of Wake Forest, N.C., Schrader Model No. 41055-1000. This same valve with some of the ports blocked may be used for valves 53, 54, 44, and 55, and, with the pneumatic actuators replaced by mechanical actuators, as valves 57 – 59 of FIG. 1 or as valve 13 of FIG. 2.

Referring again to FIG. 1, output lines 83 and 85 from valve 50 are connected together and communicate with pneumatic line 86 which in turn, is directed into an adjustable flow restrictor 87. This restrictor acts to dampen or smooth the pulses of pneumatic pressure delivered from meter tanks 79 and 80 through metering valve 50, as described below. The outlet from restrictor 87 is delivered on line 88 to bias relay 46.

Bias relay 46 operates in the same manner as that of relay 25, discussed above with reference to FIG. 2, with the feedback pressure on line 88 analogous to the signal of feedback pressure on line 18 shown in FIG. 2. Therefore, relay 46 will provide an output pressure on line 89 which is greater than the signal pressure on line 88 by an amount selected by bias control 90, again in the manner similar to that described above with reference to control 26 of FIG. 2. The output from relay 46 on line 89 is directed to one inlet of outlet control valve 55. When valve 55 is in the "on" position, the pressure in line 89 is directed therethrough to pressure line 106 and through adjustable restrictor 107 to a read-out means (not shown) such as a pen chart recorder on a pressure gauge.

Relay 46 is adjusted to provide an output signal of approximately 3 pounds per square inch when no signal pressure is received on line 88, thereby allowing use of conventional pneumatic recorders having a 3 psi zero point as the read-out means to be connected to restrictor 107.

The combined smoothed output of valve 50 on line 88 is also directed to input bias relay 45 which functions in a manner similar to relay 46 above, and causes an output on line 84 which is greater in pressure than the input on line 88 by an amount determined by control 91, as described above.

Input bias relay 45 is used to insure that the input to valve 50 on line 84 is always greater in pressure by a predetermined incremental amount than the output pressure from valve 50 on line 88. Without the use of relay 45, an increasing pulse rate resulting from rapid rotation of pulley 70 would cause a buildup of pressure in line 88 with the pressure therein approaching the pressure in line 84. As a result, the change in pressure in line 88 would not correspond linearly to a change in rotational speed of pulley 70. Instead, an upper limit of pressure in line 88 would be reached so that no increase in pressure therein would be generated by an increase in pulse rate.

The output from valve 50 on line 88 is also directed to vent control valve 54, and when that valve is in the "on" position, as described above, through pneumatic line 92 to venting orifice selector valve 93. Valve 93 is a four-way plug valve of the conventional type, and the outputs therefrom on lines 94 – 97 are connected to restrictors or orifice assemblies 98 – 101, respectively. These restrictors are then allowed to vent to atmosphere through lines 102 – 105, respectively.

In preparing the apparatus of FIG. 1 for operation, pulley 70 with clutch 60 and cams 61, 64, and 67 are positioned on a drilling rig and a wire line (not shown) is extended from pulley 70 over the crown block and back downward to the drilling rig traveling block (not shown). Adjustable restrictors 98 – 101 are adjusted for a plurality of expected pressure ranges corresponding to expected drilling rates and an appropriate range for operation is then selected on valve 93.

In addition, the output from valve 71 on line 72 is appropriately selected for the expected operating range and provided to the chart advancing mechanism of a chart recorder (not shown). Similarly, an expected range of operation is selected on valve 73.

At this point the master air control regulator 41 is actuated to deliver a 25 pound per square inch pneumatic fluid pressure signal on line 42. The apparatus is then in the standby position and ready for operation. Upon moving valve 43 to the operate position, valves 53, 54, 44 and 55 are actuated to the "on" position. Actuation of valve 44 delivers the 25 pound per square inch pneumatic pressure to valves 57 – 59. As pulley 70 is rotated by the movement of the wire line (not shown) cams 61, 64 and 67 actuate valves 57 – 59 to generate pneumatic pulses and the appropriately selected pulse is provided through valve 71 and line 72 to advance the chart recorder. At the same time, the appropriately selected pulse signal from one of valves 58 and 59 is directed through valve 73 and line 74 to valve 53 and through valve 53 to line 75 and operates upon actuator 76. As a result, valving spool 81 of valve 50 is moved from its normally leftward biased position, as shown in FIG. 4, to its rightward actuated position, as shown in FIG. 3. Continued rotation of pulley 70 will supply a series of pneumatic pulses to actuator 76 of valve 50. With each reciprocation of valve 50 meter tanks 79 and 80 will be alternately charged by the pressure from line 84 and will be discharged through lines 83 and 85, resulting in an increased pressure in lines 86, 88, 89, 92, 106, and one of lines 94 – 97. The output from line 106 through restrictor 107 is used to actuate the recorder pen of the chart recorder (not shown) or a pressure gauge (not shown) as described above. The volume of these pneumatic lines acts as an integrator of the pneumatic signal pulses from tanks 79 and 80, while restrictors 87 and 107 act to smooth any remaining surges in the output from valve 50. If the rotational speed of pulley 70 increases, valve 50 will be caused to reciprocate faster, resulting in an increased number of pulses being delivered from tanks 79 and 80, thereby increasing the overall integrated pressure signal delivered to the chart recorder. Similarly, a decrease in the speed of pulley 70 results in a fewer number of pulses directed to valve 50 and a lower integrated pressure output to the chart recorder.

If it is necessary to stop drilling temporarily, valve 43 is actuated to the standby position, thereby moving valves 44 and 53 – 55 to the "off" position. As a result, actuator pulses are no longer delivered to actuator 76 of metering valve 50; air clutch 60 is released to allow free movement of pulley 70 without movement of cams 61, 64, and 67; and the output from valve 50 is no longer vented through restrictors 98 – 101 nor provided to a read-out means through line 106 and restrictor 107. When drilling is resumed, valve 43 is again actuated to the operate position and a current reading of average rate of penetration of the drilling assembly may be observed on the read-out mechanism without waiting for a new average to be established. When valve 43 is in the "off" position the signal pressure does not bleed down, hence the "off" time is not averaged into the rate measurement.

As described above, various modifications in the apparatus of FIG. 1 are contemplated by the inventor. For example, as mentioned above with reference to the FIG. 2 embodiment, any suitable read-out means, such as a chart recorder or a simple pressure gauge may be connected to the output of restrictor 107 to monitor drilling rate. Similarly, metering valve 50 could be actuated mechanically directly from a cam, rather than pneumatically. And, meter valve 50 could be replaced with a double acting valve and a single meter tank connected thereto, as shown in FIG. 2 above.

The method of this invention may be performed using the apparatus of FIG. 1 or FIG. 2 described above, or with equivalent apparatus. Referring first to FIG. 2, the apparatus is adjusted as shown and described above. With the apparatus used to measure a rate of penetration function, wire line 11 would be connected to a drilling rig kelly (not shown) or to some other portion of the drilling mechanism, such as the traveling block, that moves linearly with penetration of a drill bit. With meter volume tank 16 charged from a source of pressurized pneumatic fluid, such as air, supplied through pressure line 19, movement of wire line 11 causes rotation of pulley 10 and of cam 12. This periodically actuates meter valve 13 and it generates a series of pneumatic pulses representative of the drilling rate function being measured. These pulses are delivered to pneumatic line 18 and to the portion of relay 25 above diaphragm 27. The volume of these containers integrates the pulses from valve 13 to provide a fairly steady-state measurement signal. This measurement signal is monitored by pressure gauge 31 connected to line 18. Bias relay 25 continually acts to supply to valve 13 and its associated pulse generating elements, a pressurized pneumatic fluid which is incrementally higher in pressure than the pressure of the measurement signal on line 18.

Using the apparatus of FIG. 1 illustrated and described above, the method step of this invention of generating a series of pneumatic pulses representative of a function being measured is performed by the rotation of cams 61, 64 and 67 operating upon valves 57 – 59 to create a pulse delivered on line 74 and through valve 53 on line 75 to actuator 76 of valve 50. Therefore, if the function being measured is drilling rate per unit time, actuator 76 will actuate valve 50 each time there is an incremental movement of pulley 70, as described above. The output pulses from valve 50 are integrated by supplying them to the volumes of lines 83, 85, and 86 and by restrictor 87 and lines 88 and 92, and the relatively steady-state pressure created within those elements becomes a measurement signal. Input bias relay 45 is provided a sample of this measurement signal on line 88 and simultaneously supplies to metering valve 50 a pressurized pneumatic fluid on line 84 which is incrementally higher in pressure than the pressure on line 88.

Meter volume tank 16 shown in FIG. 2 and meter volume tanks 79 and 80 shown in FIG. 1 (which tanks are sometimes referred to as closed containers) may have any convenient size appropriate for the range of pulse rates anticipated. For example, using the apparatus of FIG. 1 to measure drilling rate in feet per hour, cam 67 might have four lobes thereon so that 4 pulses per revolution would be generated by valve 59 and, when selected by valve 73 and delivered by line 74 to actuator 76 of valve 50, would create eight output pulses from valve 50. With a nominal input pressure to valve 50 on line 84 of 12 pounds per square inch and with an appropriately selected venting orifice (98 – 101) arranged to maintain a nominal pressure of 9 psi within the integrator portion of the apparatus, tanks 79 and 80 could each conveniently have a volume of 7.5 cubic inches, for a rotation rate of cam 67 of 1 revolution per minute, or 60 feet per hour lineal movement.

Further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiments. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. In a pneumatic apparatus for measuring a function, the combination comprising:
   means for generating a series of pneumatic pulses representative of said function being measured;
   means for integrating said pulses;
   means for monitoring the pressure of said integrated pulses;
   means for controllably venting said integrated pressure; and,
   means for supplying to said pulse generating means a pressurized pneumatic fluid which is continuously incrementally greater in pressure than the pressure in said integrating means.

2. The invention as claimed in claim 1 wherein said integrator includes:
   a pneumatic fluid container operably connected to said generating means and arranged to receive said pulses therefrom.

3. The invention as claimed in claim 2 including:
   a flow restrictor interposed between said container and said pulse generator for smoothing the pulses flowing therebetween.

4. The invention as claimed in claim 1 wherein said means for generating said pneumatic pulses includes:
   means for supplying said pressurized pneumatic fluid to a closed container; and,
   means for periodically connecting said closed container to said integrating means in response to said function being measured.

5. In a pneumatic apparatus for measuring a function, the combination comprising:
   means for generating successive pneumatic pulses representative of said function being measured;
   means for integrating said pulses to produce a measurement pressure;
   means for monitoring said measurement pressure as an indication of the value of said function being measured; and,
   means for supplying said generating means with a source of pneumatic pressure which is always greater than the pressure of said measurement pressure by a predetermined amount.

6. In a pneumatic apparatus for measuring rate of movement per unit time, the combination comprising:

means for generating a pneumatic pulse representative of each increment of movement being measured;

a metering valve having an inlet and two outlets, and having first and second closed containers connected thereto, said valve being arranged to connect one of said containers to said inlet and the other of said containers to one of said outlets in a first valve position, and arranged to connect said one container to the other of said outlets and said other container to said inlet in a second valve position;

means for interconnecting said first and second outlets;

said valve being operably arranged to receive said pneumatic pulses and to move between said first and second positions in response thereto;

means operably connected to said valve outlet for integrating pressure pulses from said containers;

means for controllably venting said integrating means;

means for supplying a pneumatic fluid to said valve inlet which is higher in pressure than the integrated pressure of said pulses; and, means for maintaining the pressure in said integrating means as an indication of the movement being measured per unit time.

7. The invention as claimed in claim 6 wherein:
said means for controllably venting includes a plurality of different restrictors; and,
means for selectively coupling one of said restrictors to said integrating means.

8. The invention as claimed in claim 6 including:
means for selectively interrupting delivery of pulses from said generating means to said valve.

9. The invention as claimed in claim 6 including:
means for selectively interrupting delivery of pulses from said generating means to said valve and simultaneously interrupting said venting of said integrating means.

10. In a method of pneumatic measurement, the combination of steps comprising:
generating a series of pneumatic pulses representative of a function being measured;
integrating said pulses to produce a measurement signal;
monitoring the pressure of said measurement signal; and,
simultaneously supplying to the pulse generating apparatus a pressurized pneumatic fluid at a predetermined incremental pressure higher than the pressure of said measurement signal.

11. The invention as claimed in claim 10 wherein said integrating step includes:
supplying said pneumatic pulses to a closed container through a pulse smoothing restrictor.

12. The invention as claimed in claim 10 wherein said step of generating said pulses includes:
supplying said pressurized pneumatic fluid to a closed container; and,
periodically releasing said fluid in said container in response to changes in said function being measured.

13. In a method of pneumatic measurement of movement, the combination of steps comprising:
supplying a first pressurized pneumatic fluid to a closed container;
periodically releasing said fluid from said container in response to said movement being monitored;
supplying said released fluid to a second container;
continuously venting the fluid in said second container through a restrictor;
maintaining the pressure of said first pressurized pneumatic fluid at a pressure incrementally higher than the pressure of fluid in said second container; and,
monitoring the fluid pressure in said second container.

* * * * *

UNITED STATES PATENT OFFICE
CERTIFICATE OF CORRECTION

Patent No. 3,750,480           Dated August 7, 1973

Inventor(s)  Ethell J. Dower

It is certified that error appears in the above-identified patent and that said Letters Patent are hereby corrected as shown below:

On the title page "PNEUMATIC MEASUREMENT APPARATUS" should read --PNEUMATIC MEASUREMENT APPARATUS AND METHOD--.

In the second column of the title page under attorney the name "Lary" should read --Larry--.

In column 1, line 1, "PNEUMATIC MEASUREMENT APPARATUS" should read --PNEUMATIC MEASUREMENT APPARATUS AND METHOD--.

In column 6, line 31, "resectively," should read --respectively,--; line 52, "direced" should read --directed--.

In column 11, line 28, "claim 6" should read --claim 1--.

Signed and sealed this 27th day of November 1973.

(SEAL)
Attest:

EDWARD M. FLETCHER, JR.  
Attesting Officer

RENE D. TEGTMEYER  
Acting Commissioner of Patents